US009000883B2

(12) United States Patent
Talty et al.

(10) Patent No.: US 9,000,883 B2
(45) Date of Patent: Apr. 7, 2015

(54) CONTROL APPARATUS AND METHOD UTILIZING IDENTIFYING KEYS

(75) Inventors: Timothy J. Talty, Beverly Hills, MI (US); Ansaf I. Alrabady, Livonia, MI (US); Michael B. Ames, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2239 days.

(21) Appl. No.: 11/272,558

(22) Filed: Nov. 10, 2005

(65) Prior Publication Data

US 2007/0064942 A1 Mar. 22, 2007

Related U.S. Application Data

(60) Provisional application No. 60/718,640, filed on Sep. 20, 2005.

(51) Int. Cl.
*G05B 23/02* (2006.01)
*G08C 17/00* (2006.01)
*G08C 19/00* (2006.01)

(52) U.S. Cl.
CPC ................ *G08C 17/00* (2013.01); *G08C 19/00* (2013.01)

(58) Field of Classification Search
CPC .......... G06K 19/0716; G06K 19/0723; G06K 19/07345; G06K 19/07749; G06K 2017/0045; G06K 7/0008; G06K 7/10019; H01H 2231/05; H01Q 21/28; H01Q 7/00; H01Q 9/16; B60N 2/0248
USPC ................ 340/3.1, 10.51, 572.7, 10.3, 10.32; 713/1, 171, 183, 185; 235/380; 365/145; 380/232
See application file for complete search history.

(56) References Cited

U.S. PATENT DOCUMENTS

| | | | | |
|---|---|---|---|---|
| 5,712,625 | A * | 1/1998 | Murphy | 340/5.22 |
| 6,243,012 | B1 | 6/2001 | Shober et al. | |
| 6,285,295 | B1 * | 9/2001 | Casden | 340/12.24 |
| 6,726,099 | B2 | 4/2004 | Becker et al. | |
| 6,809,952 | B2 | 10/2004 | Masui | |
| 6,828,902 | B2 * | 12/2004 | Casden | 340/10.3 |
| 2002/0026586 | A1 * | 2/2002 | Ito | 713/183 |
| 2002/0047777 | A1 * | 4/2002 | Casden | 340/10.32 |
| 2002/0118579 | A1 * | 8/2002 | Lucy et al. | 365/200 |
| 2005/0060546 | A1 * | 3/2005 | Parry et al. | 713/171 |
| 2005/0235159 | A1 * | 10/2005 | Anandakumar et al. | 713/185 |
| 2006/0100983 | A1 * | 5/2006 | Atkinson et al. | 707/1 |
| 2007/0200681 | A1 * | 8/2007 | Colby | 340/10.51 |

OTHER PUBLICATIONS

Matthai Philipose et al., Battery-Free Wireless Identification and Sensing, Pervasive Computing, Jan.-Mar. 2005, pp. 37-45, V4, Issue 1,IEEE.

* cited by examiner

*Primary Examiner* — Vernal Brown
*Assistant Examiner* — Sisay Yacob

(57) ABSTRACT

Method and apparatus for system control includes inputs for an input device which may take the form of switches or sensors. Input device states are related to identification keys. The identification keys are communicated wirelessly or through hard-wired means to a system.

23 Claims, 5 Drawing Sheets

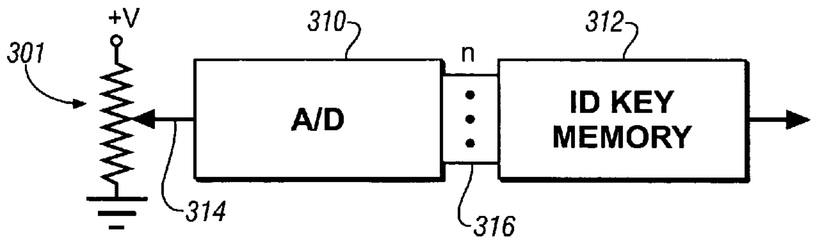
FIG. 6
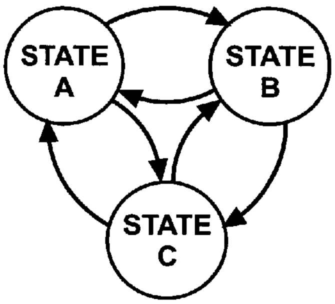
FIG. 7A
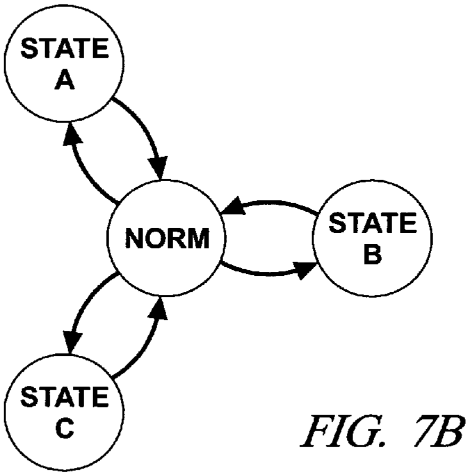
FIG. 7B
| SWITCH TRANSITION | SYSTEM RESPONSE |
|---|---|
| A - B | + |
| B - A | − |
| B - C | + |
| C - B | − |
| C - A | + |
| A - C | − |
FIG. 8

CONTROL APPARATUS AND METHOD UTILIZING IDENTIFYING KEYS

CROSS REFERENCE TO RELATED APPLICATIONS

This application claims priority from U.S. Provisional Application Ser. No. 60/718,640 filed Sep. 20, 2005.

TECHNICAL FIELD

The present invention is related to system control relying on device inputs. More particularly, the invention is concerned with switch and sensor state identification and control relying thereon.

BACKGROUND OF THE INVENTION

Conventional input devices use multiple wires for opening, closing and coupling circuits and for sensing of current, voltage, or impedance to determine input device states. Such wiring, particularly in applications such as automotives, can be a source of undesirable assembly and reliability issues. Wire routing is inherently more difficult in certain portions of a vehicle. Wire routing is also a significant source of system reliability issues. Furthermore, certain wiring issues may make system diagnosis more difficult when such issues appear intermittently.

Therefore, it is desirable to provide for systems that rely less on wiring in their application.

SUMMARY OF THE INVENTION

This invention relates identification keys to device states, including switches and sensors, and communicates the identification keys to a controller for use in control of a system based on the current identification keys and/or identification key transitions. While the invention may be practiced with wireless and hardwired communications, the architecture and method of the present invention enables ready integration with wireless technologies, such as radio frequency identification technologies.

A method for system control in accordance with the invention includes relating device states to identification keys, communicating the identification keys to a controller, and controlling an apparatus based on the communicated identification keys. Relating the device states to identification keys may include, for example: encoding a plurality of switch inputs to address a memory structure; decoding a plurality of switch inputs to address a memory structure; addressing a memory structure with a plurality of switch inputs; multiplexing a memory structure in accordance with a plurality of switch inputs; converting an analog sensor signal to a digital address and referencing a memory structure with the address; or, referencing a memory structure based on a digital sensor signal. Communicating the identification keys may include, for example, transmitting the identification key using wireless or hardwired communication links. And, controlling the apparatus may be based on current identification keys or on changes in identification keys.

A control apparatus in accordance with the invention includes a device having a plurality of device states, an identification key selection apparatus for selecting identification keys corresponding to current device states, and a communication device for communicating selected identification keys to a controller. The device may include a switch or a sensor, for example. The identification key selection apparatus may include, for example, a radio frequency identification chip or a memory apparatus and means for addressing the memory apparatus based on current device states. The communication device may include, for example, wireless or hardwired communication apparatus, and more particularly a frequency identification chip.

A control apparatus in accordance with the invention includes selection apparatus coupled to an input device, wherein the selection apparatus is effective to interpret states of the input device and to provide at least one identification key uniquely corresponding to a present state of the input device. The control apparatus further includes communication apparatus to convey identification keys provided by the selection apparatus to a system controller, wherein the system controller is effective to produce a response based on the identification keys conveyed thereto. The selection apparatus may include, for example, a radio frequency identification chip or a memory apparatus and means for addressing the memory apparatus based on current states of the input device. The communication apparatus may include, for example, wireless or hardwired communication apparatus, and more particularly a frequency identification chip.

These and other aspects of the invention will become apparent to those skilled in the art upon reading and understanding the following detailed description and drawings of certain exemplary embodiments.

BRIEF DESCRIPTION OF THE DRAWINGS

FIG. 6 illustrates an exemplary embodiment of sensor state identification key determinations in accordance with the present invention;

FIGS. 7A and 7B illustrate alternative switch state diagrams useful in understanding the application of switch state transitions in a bi-directional user interface control in accordance with the present invention; and FIG. 8 illustrates a chart mapping switch transition to system responses for use in a bi-directional user interface control in accordance with the present invention.

DESCRIPTION OF THE PREFERRED EMBODIMENT

Figure 1:
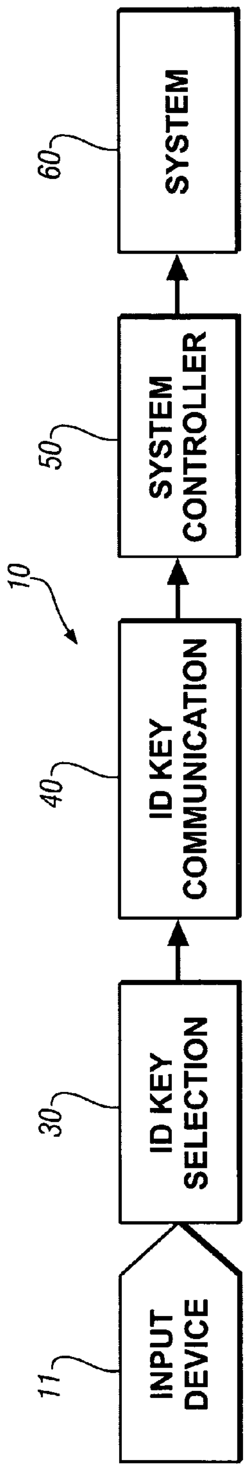
FIG. 1 illustrates a schematic block diagram of switch state determination, communication and system response in accordance with the present invention.

With reference first to FIG. 1, a schematic block diagram of input device state determination, communication and system response in accordance with the present invention is illustrated. A control system 10 includes input device 11. Input device 11 may comprise any of a variety of interfaces between an operator, an apparatus or environment, and a system controller responsive thereto. Non-limiting examples of such input devices include single or multiple switches operative individually or in groups and sensors. An operator, for example a vehicle occupant, may actuate toggle switches in a door pad and door locks are controlled in response thereto. Similarly, an operator may actuate rotary or slide switches on a climate control panel and mode selections, temperature settings and air outlet selections are controlled in response thereto. An electronic throttle control system includes a throttle position sensor and throttle plate position is controlled in response thereto. A semi-active suspension system includes a damper position sensor and the damper is controlled in response thereto. An engine control system may rely upon temperature sensors (e.g. ambient air, coolant) as inputs to a variety of control functions affecting performance and emissions.

In accordance with the present invention, input device states are provided to and received by identification key selection block 30. Identification key selection block 30 represents the selection of one or more identification keys, preferably embodied in the form of n-bit binary words containing data corresponding to the input device state. Once selected, the identification keys are provided in controlled fashion as represented by identification key communication block 40 to a computer-based system controller as represented by system controller block 50. Identification key communication block 40 may comprise such hardware, software and associated functionality to effect wired or wireless communication of the identification keys including via any of a variety of serial or parallel data communications protocols as may be appropriate in any given application. Computer-based system controller as represented by system controller block 50 comprises conventional processing hardware that may be programmed to carry out particular control applications upon a variety of systems as represented by systems block 60 when properly interfaced with required inputs, including the presently described identification keys. The computer-based system controller may directly provide current and voltage control of actuators, may communicate desired control signals to other controllers for implementation such as in a supervisory role, display information, or provide any of a variety of other functions based upon input device states.

Figure 2:
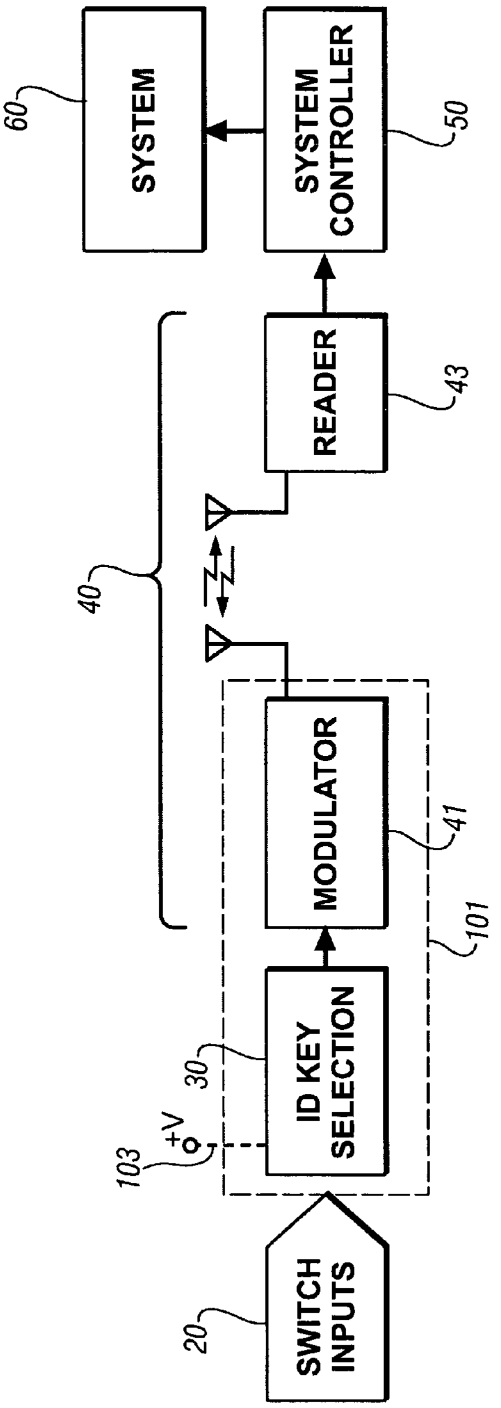
FIG. 2 illustrates a more detailed wireless implementation of the communication aspects of the schematic block diagram of FIG. 1 in accordance with the present invention.

In an exemplary wireless link implementation of communication in accordance with the present invention, and with additional reference to FIG. 2, one or more switch inputs 20 are provided to either a transceiver, for the case of bi-directional communications, or a transmitter for uni-directional communications. For this exemplary implementation, switch inputs 20 are provided to transponder 101. Transponder 101 may take the form of a system on chip which integrates onto a single fabricated silicon chip all required functionality of the transponder 101—including in certain frequency applications antenna structure. One such system on chip implementation that is well known to practitioners in the technological fields related to radio frequency identification systems may be referred to in the art and herein as radio frequency identification chips or RFID chips. Though RFID chips are one technical implementation of transponder 101, it is understood that other implementations are within the scope of the present invention and other communication mechanisms, including wired and other wireless communication protocols could be used to facilitate identification key selection and communication. The transponder implementation is offered by way of explanation and example and not by way of limitation. Transponder 101 includes forward communication link functions (not separately illustrated) and reverse communication link functions, of which signal modulation is represented by modulator block 41. Forward communication link functions could include radio frequency energy harvesting (for passive transponders) (e.g. rectification, voltage multiplication/charge pumping) and radio frequency signal demodulation. Reverse communication link functions include clock generation, communication protocol management including anti-collision and signal modulation. While a passive transponder is assumed for the remaining explanation herein, semi-passive transponders and active transceivers are also envisaged and equally employable for carrying out the present invention. A separate power source would be associated with semi-passive transponders and active transceivers and is illustrated as an alternative by the dashed line 103 coupling a voltage source (+V) to transponder 101. Identification key selection block 30 is shown providing identification keys to modulator block 41 for effecting wireless communication of identification key information. In accordance with the present example of passive transponder 101, modulation of the identification keys is by way of conventional backscatter modulation techniques such as antenna shunting or loading to, for example, effect amplitude shift keying (ASK) or phase shift keying (PSK), or other parameter modulation of the signal waveform. A receiver, referred to as reader 43 provides a radio frequency signal which may include data transmissions to transponder 101 to effect an interrogation requesting transmission of identification key data. Reader 43 may periodically interrogate or may provide a substantially continuous radio frequency signal relying upon transponder notifications of identification key data transmissions. In the present exemplary passive transponder embodiment, reader 43 receives modulated backscatter radio frequency signals and through well known processing thereof determines the identification key information communicated by the transponder. Wireless communications including interrogations, transponder modulations and reader receptions are all handled in accordance with well known radio frequency communications protocols including anti-collision management in the case of a multiplicity of transponders. Reader 43 then provides the identification keys as previously described with respect to FIG. 1.

The previous example demonstrated one exemplary deployment of the present invention utilizing a wireless communication link and, more particularly, utilizing RFID technology. The present invention, however, is not limited to wireless transmission implementations as previously mentioned. Hardwired communication paths (e.g. communication buses) could also be implemented between the modulator 41 and receiver 43 in accordance with well know communication protocols.

Figure 3A:
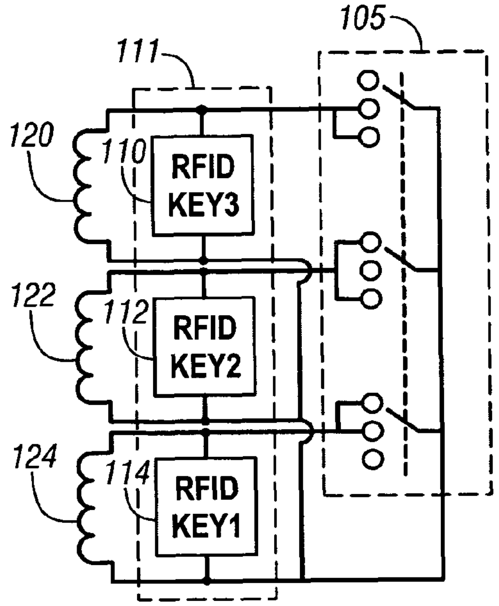
FIGS. 3A-3C illustrate in further detail particular wireless embodiments of switch state determination and transmission aspects of exemplary radio frequency identification tag implementations of the present invention.

In accordance with one exemplary wireless implementation of the present invention, FIG. 3A illustrates an embodiment wherein conventional RFID chip technology is employed to provide identification keys. In such embodiment, the RFID chips could either be separate silicon structures each having a single, unique identification key associated therewith and stored thereon in a conventional memory structure which may include some type of non-volatile memory or integrated onto a single silicon structure. In this embodiment, three RFID chips variously labeled 110, 112 and 114 in the figure have associated antennas 120, 122 and 124, respectively. Alternatively, as mentioned, the functionality of the individual RFID chips may be consolidated onto a unitary silicon structure 111. Antennas take an appropriate form corresponding to the particular implementation considerations including radio frequency of the RFID chips, packaging and operative environment. Examples of antenna structures for this and all embodiments and implementations described herein, include on-chip fabricated antenna geometries, and off-chip antennas such as coil, patch and bow-tie geometries fabricated, for example, from conductive inks, foils and printing processes. The RFID chips are interfaced with a three state switch 105 illustrated schematically in the figure. In each of the three switch states only one of the antennas is controllable by the associated RFID chip to effect backscatter modulation or other modulation scheme employed by that particular RFID chip. The other two RFID chip/antenna pairings are effectively rendered inoperative via shunting through the three state switch 105. Fewer or more switch states may be defined in accordance with a particular application. Also, multiple ones of such RFID chip/antenna pairings may remain controllable in any given switch state to effect a corresponding multiplicity of communicated identification keys associated with such switch states.

Figure 3B:
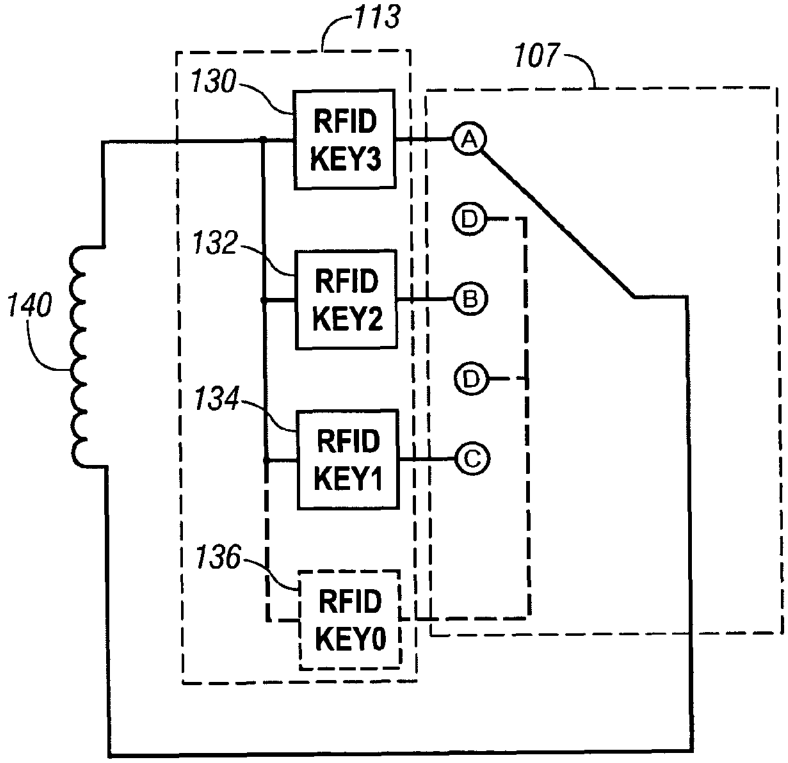

In accordance with another exemplary wireless implementation of the present invention, FIG. 3B illustrates an embodiment wherein conventional RFID chip technology is employed to provide identification keys. Here, a single transponder antenna is utilized. As in the previously described embodiment, RFID functionality may be provided by RFID chips that are separate silicon structures each having a single, unique identification key associated therewith and stored thereon in a conventional memory structure which may include some type of non-volatile memory. Discrete RFID chips variously labeled 130, 132 and 134 in the figure share a single antenna 140. Optionally, another RFID chip 136 is illustrated as described further herein below. Alternatively, the functionality of the individual RFID chips may be consolidated onto a unitary silicon structure 113. The RFID chips are interfaced with a four state switch 107 illustrated schematically in the figure. In each of the four switch states only one of the RFID chips is coupled to antenna 140 to effect backscatter modulation. The other three RFID chips are effectively rendered inoperative via the decoupling from antenna 140. Fewer or more switch states may be defined in accordance with a particular application. Also, multiple ones of such RFID chips may remain coupled to antenna 140 in any given switch state to effect a corresponding multiplicity of communicated identification keys associated with such switch states. One of the switch states is associated with the optional RFID chip 136 which may correspond to a normal, default, neutral, inactive, off, detent, rest or similar switch position hereafter referred to as normal switch position or state. Such position may be associated with a switch system diagnostic process particularly where the remaining switch positions are momentary or transitory in nature.

Figure 4A:
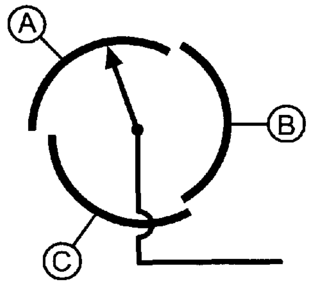
FIGS. 4A and 4B illustrate alternate switch embodiments for use in carrying out a three switch state apparatus in accordance with the present invention.
Figure 4B:
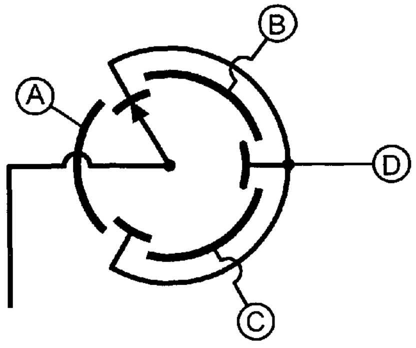

With additional reference to FIG. 4A, a rotary-type switch schematic is illustrated which is particularly well suited for implementing incrementing/decrementing or similar bi-directional user interface control using a three RFID identification key switch system as illustrated in accordance with one alternative of FIG. 3B wherein there is not provide an optional RFID identification key and corresponding normal switch position. In such a switch system application the transitions from one of switch states A, B and C to another are direct. Rotation in one direction produces the sequential switch state transition pattern A-B-C-A whereas rotation in the opposite direction produces the sequential switch state transitional pattern A-C-B-A. These switch state transition patterns are further illustrated with respect to FIG. 7A. FIG. 8 in addition shows one interpretation of such switch state transitions by a system controller and an intended system response wherein a (+) indicates control in one direction for example to increment a system setting in one direction (e.g. volume up, position forward, temperature up) and wherein a (−) indicates control in an opposite direction for example to decrement a system setting in an opposite direction (e.g. volume down, position backward, temperature down). FIG. 4B similarly illustrates a rotary-type switch schematic which is particularly well suited for implementing incrementing/decrementing or similar bi-directional user interface control using a four RFID identification key switch system as illustrated in accordance with the other alternative of FIG. 3B wherein there is provided an optional RFID identification key and corresponding normal switch position. In such a switch system application the transitions from one of switch states A, B and C to another are through a normal switch state D. Rotation in one direction produces the sequential switch state transition pattern A-D-B-D-C-D-A whereas rotation in the opposite direction produces the sequential switch state transitional pattern A-D-C-D-B-D-A. These switch state transition patterns are further illustrated with respect to FIG. 7B. FIG. 8 in addition shows one interpretation of such switch state transitions however ignoring intermediate normal states that is otherwise as described herein above with respect to FIG. 7A.

Figure 3C:
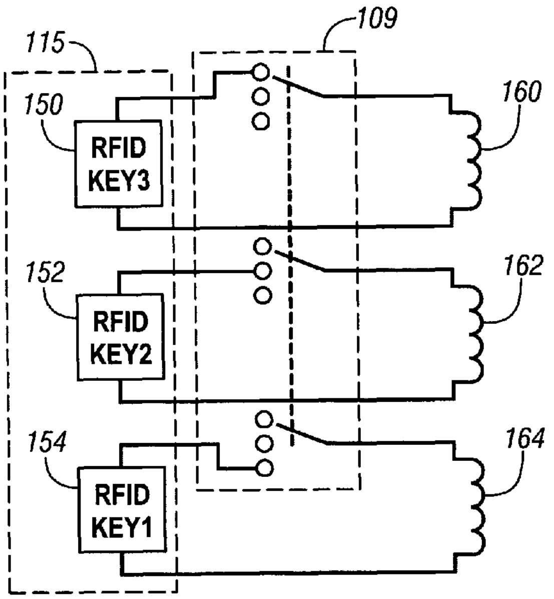

In accordance with another exemplary wireless implementation of the present invention, FIG. 3C illustrates an embodiment wherein conventional RFID chip technology is employed to provide identification keys. Here, multiple transponder antennas are utilized. As in the previously described embodiments, RFID functionality may be provided by RFID chips that are separate silicon structures each having a single, unique identification key associated therewith and stored thereon in a conventional memory structure which may include some type of non-volatile memory. Discrete RFID chips variously labeled 150, 152 and 154 in the figure have associated antennas 160, 162 and 164, respectively. Alternatively, the functionality of the individual RFID chips may be consolidated onto a unitary silicon structure 115. The RFID chips are interfaced with a three state switch 109 illustrated schematically in the figure. In each of the three switch states only one of the antennas is controllable by the associated RFID chip to effect backscatter modulation. The other two RFID chip/antenna pairings are effectively rendered inoperative via RFID chip/antenna decoupling. Fewer or more switch states may be defined in accordance with a particular application. Also, multiple ones of such RFID chip/antenna pairings may remain controllable in any given switch state to effect a corresponding multiplicity of communicated identification keys associated with such switch states.

With reference now to FIGS. 5A-5D a variety of exemplary embodiments of switch state identification key determinations in accordance with the present invention are schematically illustrated. In a first embodiment illustrated with reference to FIG. 5A, a single switch 210 interfaces with a plurality ($2^n$) of switch inputs 231 each of which corresponds to a unique switch state. Switch inputs 231 are preferably processed through buffer circuitry 201 to effect filtering and switch debouncing whereafter the processed switch inputs 233 are passed to encoder 203. Encoder 203 interprets the active one of the switch inputs as determined by the single switch 210 and provides a unique binary code 235 of n-bits. The binary code is used to address a correspondingly unique identification key from identification key memory apparatus 205. Identification key memory apparatus 205 may take the form of any non-volatile memory storage means including variations of re-writable and read-only memories.

Figure 5A:
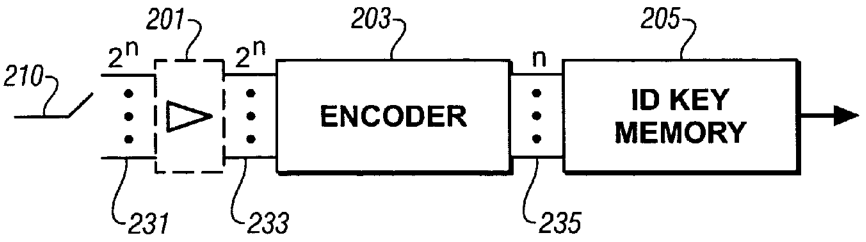
FIGS. 5A-5D illustrate alternate exemplary embodiments of switch state identification key determinations in accordance with the present invention.
Figure 5B:
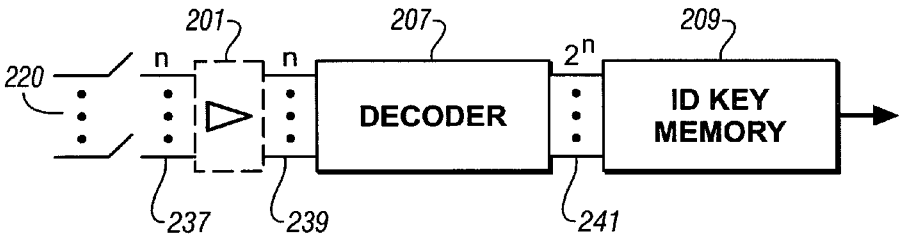

In another embodiment illustrated with reference to FIG. 5B, a plurality (n) of switches 210 interface with a corresponding plurality (n) of switch inputs 237. Any combination of switch inputs may be provided hence producing ($2^n$) possible combinations of the n switches. Switch inputs 237 are preferably processed through buffer circuitry 201 to effect filtering and switch debouncing whereafter the processed switch inputs 239 are passed to decoder 207. Decoder 207 interprets the n switch combination and provides a unique output on one of ($2^n$) outputs 241. The unique output is used to address a correspondingly unique identification key from identification key memory apparatus 209. Identification key memory apparatus 209 may take the form of any non-volatile memory storage means including variations of re-writable and read-only memories.

Figure 5C:
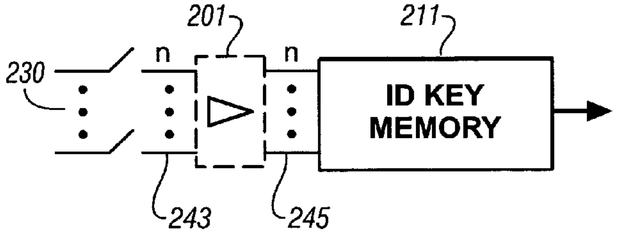

In yet another embodiment illustrated with reference to FIG. 5C, a plurality (n) of switches 230 interface with a corresponding plurality (n) of switch inputs 243. Any combination of switch inputs may be provided hence producing ($2^n$) possible combinations of the n switches. Switch inputs 243 are preferably processed through buffer circuitry 201 to effect filtering and switch debouncing whereafter the processed switch inputs 245 address identification key memory apparatus 211 which provides a correspondingly unique identification key. Identification key memory apparatus 211 may take the form of any non-volatile memory storage means including variations of re-writable and read-only memories.

Figure 5D:
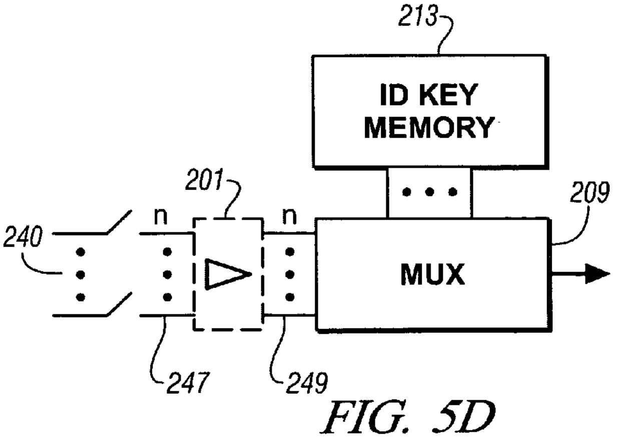

In a final example illustrated with reference to FIG. 5D, a plurality (n) of switches 240 interface with a corresponding plurality (n) of switch inputs 247. Any combination of switch inputs may be provided hence producing ($2^n$) possible combinations of the n switches. Switch inputs 247 are preferably processed through buffer circuitry 201 to effect filtering and switch debouncing whereafter the processed switch inputs 245 are passed to multiplexer 209. Multiplexer 213 uses the processed switch inputs 249 to output one of a plurality of unique identification keys from identification key memory apparatus 205. Identification key memory apparatus 213 may take the form of any non-volatile memory storage means including variations of re-writable and read-only memories.

In FIG. 6, an exemplary embodiment of sensor state identification key determinations in accordance with the present invention is schematically illustrated. Here, an input device includes a potentiometer-type apparatus. An analog voltage or current signal line 314 interfaces with an input of an analog-to-digital (A/D) converter 310. Though not separately illustrated, the interface may include common filtering functionality. The input may indicate position, for example, of a wiper contact upon a linear or rotary potentiometer 301 as commonly used in linear or rotary position sensors. A/D converter 310 provides an n-bit output corresponding to a granularity or resolution of $2^n$ unique divisions. The n-bit output addresses identification key memory apparatus 312 to provide a correspondingly unique identification key. Any sensor providing an analog signal, such as variable voltage or current, may be utilized with appropriate A/D conversion apparatus to provide an address to identification key memory apparatus 312. Alternatively, a sensor may provide digital output in the form of a code suitable for decoding into an address or in the form of an address for use in referencing identification key memory structure 312. Furthermore, such a digital output from a sensor may be provided for identification key selection serially over a data line.

Any of the previously described identification key determinations can be performed in a wireless communication scheme by employing conventional RFID technologies including implementations that utilize individual RFID chips for each required identification key. Alternatively, RFID chips integrating multiple identification keys may be utilized, for example in conjunction with selectable memory apparatus. Also, microcontroller and microprocessor based implementations are also envisaged particularly in applications wherein additional functionality is desired.

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. Method for system control comprising;

relating an active device state of an input device to an identification key comprising ;

transitioning the device state of the input device from a previous device state to the active device state based on a device state input respective to the active device state that is input to the input device, wherein the previous device state is based on a previous device state input respective to the previous device state that was previously input to the input device; and selecting a unique identification key corresponding to the transitioned to active device state, each possible device state representing a possible setting of the input device and corresponding to a distinct unique identification key containing data comprising an input for controlling an apparatus of a system to transition to a system setting corresponding to the respective device state;

communicating the unique identification key to a system controller; and in response to receiving the communicated unique identification key at the system controller from the input device, utilizing the system controller to control the apparatus of the system to transition from a previous system setting based on a previously selected identification key corresponding to the previous device state to an active system setting based on the presently communicated unique identification key corresponding to the active device state, wherein the apparatus of the system comprises one of an actuator and an additional controller of the system.

2. The method for system control as claimed in claim 1 wherein relating the active device state to the identification key further comprises encoding a plurality of switch inputs to address a memory structure.

3. The method for system control as claimed in claim 1 wherein relating the active device state to the identification key further comprises decoding a plurality of switch inputs to address a memory structure.

4. The method for system control as claimed in claim 1 wherein relating the active device state to the identification key further comprises addressing a memory structure with a plurality of switch inputs.

5. The method for system control as claimed in claim 1 wherein relating the active device state to the identification key further comprises multiplexing a memory structure in accordance with a plurality of switch inputs.

6. The method for system control as claimed in claim 1 wherein relating the active device state to the identification key further comprises converting an analog sensor signal to a digital address and referencing a memory structure with the address.

7. The method for system control as claimed in claim 1 wherein relating the active device state to the identification key further comprises referencing a memory structure based on a digital sensor signal.

8. The method for system control as claimed in claim 1 wherein communicating the unique identification key comprises transmitting the unique identification key using wireless communication links.

9. The method for system control as claimed in claim 1 wherein communicating the unique identification key comprises transmitting the unique identification key using hardwired communication links.

10. Control apparatus comprising:

an input device having a plurality of device states, each device state representing a possible setting of the input device and corresponding to a distinct identification key containing data comprising an input for controlling an apparatus of a system to transition to a system setting respective to the device state, the input device receiving a device state input respective to a current device state for transitioning from a previous device state to the current device state, wherein the previous device state is based on a previous device state input respective to the previous device state that was previously received by the input device;

an identification key selection apparatus for selecting identification keys corresponding to the transitioned to current device state;

a communication device for communicating selected identification keys to a controller from the input device; and the controller responsive to the communicated identification keys to control the apparatus of the system to transition from a previous system setting based on a previously selected identification key corresponding to the previous device state to a current system setting based on the communicated selected identification keys, wherein the apparatus of the system comprises one of an actuator and an additional controller.

11. The control apparatus as claimed in claim 10 wherein the input device comprises a switch.

12. The control apparatus as claimed in claim 10 wherein the input device comprises a sensor.

13. The control apparatus as claimed in claim 10 wherein the identification key selection apparatus comprises a radio frequency identification chip.

14. The control apparatus as claimed in claim 10 wherein the identification key selection apparatus comprises a memory apparatus and means for addressing the memory apparatus based on current device states.

15. The control apparatus as claimed in claim 10 wherein the communication device comprises a radio frequency identification chip.

16. The control apparatus as claimed in claim 10 wherein the communication device comprises wireless communication apparatus.

17. The control apparatus as claimed in claim 10 wherein the communication device comprises hardwired communication apparatus.

18. The control apparatus as claimed in claim 15 wherein the communication apparatus comprises hardwired communication apparatus.

19. Control apparatus comprising:

an input device relating a plurality of device states, each device state representing a possible setting of the input device, to a plurality of identification keys, each identification key corresponding to a respective one of the device states and containing data comprising an input for controlling a system to transition to a system setting, the input device receiving a device state input respective to a present device state for transitioning from a previous device state to the present device state, wherein the previous device state is based on a previous device state input respective to the previous device state that was previously received by the input device;

selection apparatus coupled to the input device, the selection apparatus effective to interpret the device states of the input device and to provide at least one identification key uniquely corresponding to at least one respective present device state of the input device;

communication apparatus to convey the at least one identification key provided by the selection apparatus to a system controller; and wherein said system controller is effective to produce a response based on the identification keys conveyed thereto for controlling the system to transition from a previous system setting based on at least one previously selected identification key corresponding to the previous device state to a present system setting based on the communicated at least one identification key uniquely corresponding to the at least one respective present device state of the input device, wherein the system comprises one of an actuator and an additional controller.

20. The control apparatus as claimed in claim 19 wherein the selection apparatus comprises a radio frequency identification chip.

21. The control apparatus as claimed in claim 19 wherein the selection apparatus comprises a memory apparatus and means for addressing the memory apparatus based on current states of the input device.

22. The control apparatus as claimed in claim 19 wherein the communication apparatus comprises a radio frequency identification chip.

23. The control apparatus as claimed in claim 19 wherein the communication apparatus comprises wireless communication apparatus.

* * * * *